Figure 1:
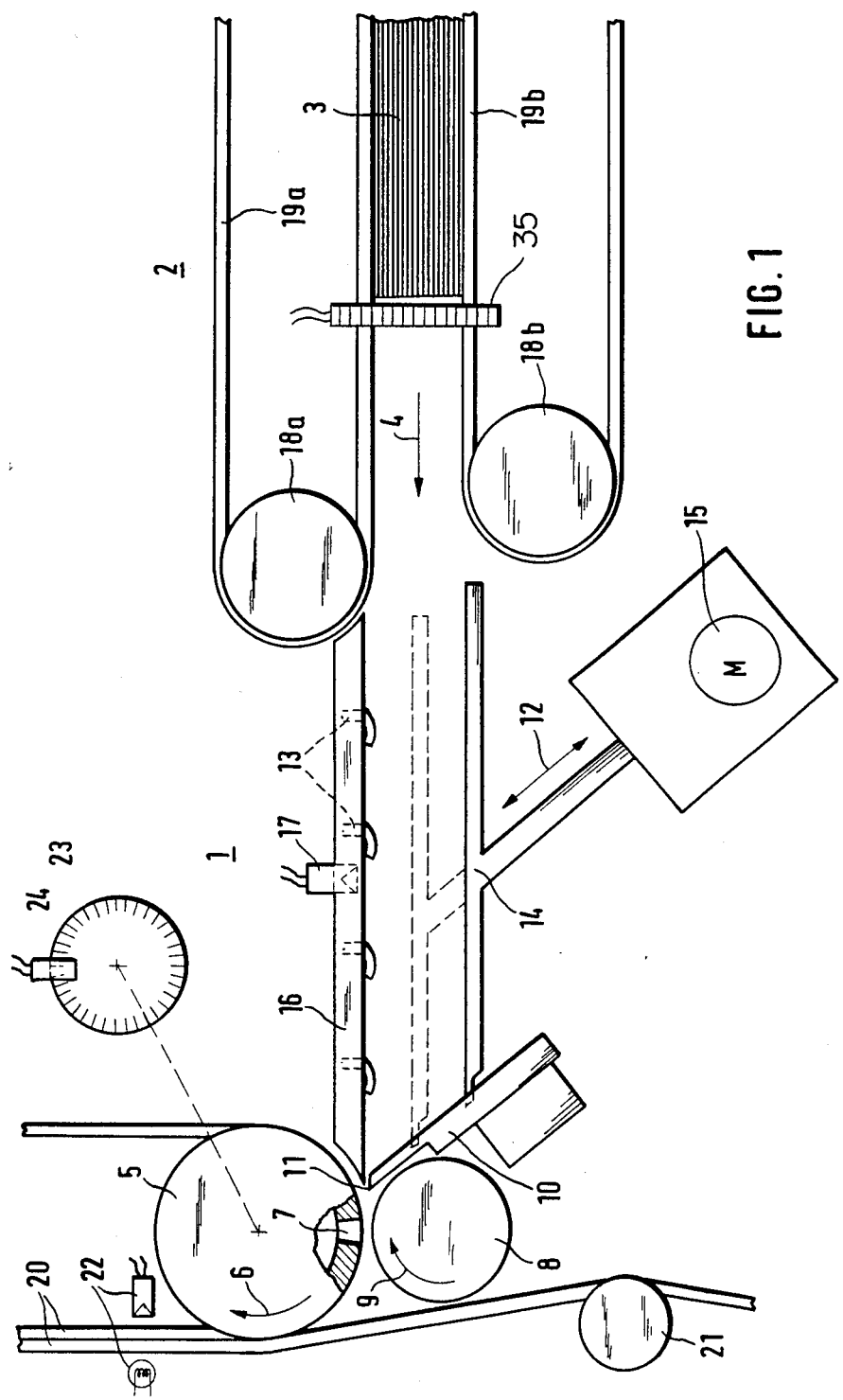

United States Patent [19]

Mitzel et al.

[11] Patent Number: 4,790,525
[45] Date of Patent: Dec. 13, 1988

[54] APPARATUS AND A METHOD FOR SEPARATING SHEET MATERIAL

[75] Inventors: Wilhelm Mitzel, Neukeferloh; Karl-Heinz Leuthold; Josef Geier, both of Munich, all of Fed. Rep. of Germany

[73] Assignee: GAO Gesellschaft fur Automation and Organisation mbH, Fed. Rep. of Germany

[21] Appl. No.: 149,899

[22] Filed: Jan. 28, 1988

Related U.S. Application Data

[63] Continuation of Ser. No. 812,313, Dec. 23, 1985, abandoned.

[30] Foreign Application Priority Data

Dec. 28, 1984 [DE] Fed. Rep. of Germany ....... 3447777

[51] Int. Cl.[4] ............................................. B65H 3/14
[52] U.S. Cl. .................................. 271/97; 271/30.1; 271/111; 271/155; 271/157
[58] Field of Search .................. 271/38, 110, 111, 117, 271/94, 97, 98, 30.1, 31, 152–155, 157

[56] References Cited

U.S. PATENT DOCUMENTS

| 3,937,453 | 2/1976 | Hickey | 271/110 X |
|---|---|---|---|
| 4,148,473 | 4/1979 | Johnson | 271/155 X |
| 4,302,000 | 11/1981 | Frank | 271/148 X |
| 4,331,328 | 5/1982 | Fasig | 271/111 X |
| 4,357,007 | 11/1982 | Franciscus | 271/111 X |
| 4,544,149 | 10/1985 | Graef | 271/111 X |
| 4,558,859 | 12/1985 | Duke | 271/148 X |
| 4,593,895 | 6/1986 | Myers | 271/148 |

FOREIGN PATENT DOCUMENTS

| 1901846 | 9/1969 | Fed. Rep. of Germany . |
|---|---|---|
| 2454082 | 5/1975 | Fed. Rep. of Germany . |
| 2814306 | 10/1979 | Fed. Rep. of Germany . |
| 2850351 | 5/1980 | Fed. Rep. of Germany . |
| 1249706 | 10/1971 | United Kingdom . |
| 2055085 | 2/1981 | United Kingdom . |
| 2071623 | 9/1981 | United Kingdom . |

*Primary Examiner*—Richard A. Schacher
*Attorney, Agent, or Firm*—Bacon & Thomas

[57] ABSTRACT

A separating apparatus for sheet material in which the sheet material is conveyed in stacks via a stack transporting system to a stack holder including a stack manipulator for effecting selective mechanical manipulation of the stack going through the separation process in the event that a deviation from the proper separation process is detected. In addition, a stack tester may be provided for testing the geometric and physical condition of the stack of sheet material before and during separation. An irregularity occurring during separation can be combatted by instituting a stack manipulation procedure which appears best suitable for automatically eliminating the disturbance of the separation process.

25 Claims, 3 Drawing Sheets

APPARATUS AND A METHOD FOR SEPARATING SHEET MATERIAL

This application is a continuation of application Ser. No. 812,313, filed Dec. 23, 1985, now abandoned.

The present invention relates to an apparatus for separating flat sheet material, for example vouchers, bank notes and the like, essentially consisting of a stack holding means, a sheet feeding means, a sheet withdrawing means and a retaining means, in which the sheet material is conveyed in stacks via a stack transporting system to the stack holding means, from which it is fed sheet by sheet to a transport system leading on further, by the interaction of the feeding, withdrawing and retaining means.

The task to be performed by separating apparatus generally consists in withdrawing individual sheets from a stack as reliably as possible and in some cases as fast as possible, depending on the application. In this context, reliability means that the sheets are separated sequentially without any so-called "separation omissions" and that the distance between the successive sheets has a definite and constant value.

Many separating apparatus for performing the above task are known.

German Pat. No. 24 54 082, for example, describes a separating apparatus consisting essentially of a separating roller, a retaining roller, a retaining element and a feed roller. The stack is held between a supporting plate and a pressure plate, whereby the feed roller conveys one or several sheets at a time to the separating roller through a separating gap formed between the separating roller and the retaining element. The retaining element against which the leading edges of the sheets of the stack lie ensures, by a kind of pre-separation, that only a limited number of sheets is ever advanced to the separating roller. The separating roller is designed as a suction roller. It grasps the leading edges of the sheets to be separated in order to transfer them successively to a transport system leading on further. In order to prevent double withdrawals, a retaining roller is provided opposite the separating roller, is also designed as a suction roller, rotates in the opposition direction to the separating roller and ensures that only the sheet lying against the separating roller is ever separated. The separating apparatus is also provided with a shaking means connected with the stack supporting plate for constantly acting upon the stack going through the separation process. The shaking movement is supposed to loosen up the stack, on the one hand, so that the individual sheets of the stack can be more easily separated from one another, and to impart to the stack a movement component toward the separating gap, on the other hand. This measure, which promotes the reliability of separation, is applied to each stack during the entire separation process. The aggregate generating the shaking movement causes a permanent level of noise which is considerable. The permanent shaking of the stack does ensure a certain continuity of the separation process, but it provokes disturbances if the sheet material of the stack is of extremely high quality or if it is of very poor quality as well, in that it promotes a tendency of the stack to be wedged, for example, or causes sheets protruding out of the stack to be shaken out of the stack completely, etc. Such disturbances can generally only be eliminated by time-consuming manual intervention.

When separatus apparatus of the stated type are used in high speed sorting machines (e.g. 40 bills per second), the demands made of the efficiency of this apparatus are particularly high. The apparatus should not only work fast and reliably but also be capable of processing sheets of greatly varying quality without any interruption. When bank notes are being processed, their quality ranges from virtually unused, stiff and relatively smooth to greatly worn, flaccid, roughened and even torn sheets. It is a further difficulty that these different qualities can occur in any random distribution.

Obviously, the functioning of the separating apparatus has a substantial influence on the efficiency of the sorting machine. The apparatus should therefore have a high and continuous throughput regardless of the quality of the sheets, if possible. Since manual intervention fundamentally has an adverse effect on the throughput, the apparatus should further ensure that manual intervention on the part of the operator of the sorter is reduced to a minimum.

The invention is therefore based on the problem of proposing an apparatus for separating flat sheet material, in particular bank notes, which has a high throughput as well as high reliability of separation more or less regardless of the state of conservation of the bank notes.

This problem is solved according to the invention by the features stated in the claims.

According to the solution stated in the main claim, an essential feature of the invention is that the separation sequence is constantly monitored automatically and that, in the case of a disturbance, the stack located in the separating apparatus is immediately influenced using mechanical means in a selective fashion adapted to the disturbance.

According to a development of the invention, the type of manipulation at the stack is made contingent not only on the type of disturbance ascertained but also on what information is present on the state and shape of the stack ready for separation. This is information indicating which properties cause the stack to be separated to differ from an ideal or desired stack which is known to allow for uncomplicated separation. For example, a stack may be more or less wavy due to incorrect storage, it may have folded edges, one or more bills may protrude out of the stack; the bank notes may also be so worn that the stack is considerably thicker than a stack containing ony slightly worn bills, etc. In addition to the stated deviations, which the stack generally has even before separation proper, the stack may assume shapes during separation which may lead to a disturbance of the separation process. The information detected by appropriate sensors on the shape and state of the stack before and during separation is collected and intermediately stored until a case of disturbance, if desired. in view of this information that measure which appears to be most appropriate for eliminating the particular disturbance is then taken for the irregularity occurring during separation.

According to a further development of the invention, the information on the shape and state of the stack obtained before and during separation may also be used to ascertain the probability of a disturbance in advance. For example, if the front edge of the stack is folded over due to incorrect storage, it is highly probable that the feed means of the separator will not be capable of conveying the individual sheets through the separating gap. In this specific case, the abutting edge can be deformed by way of precaution, so to speak, using an appropriate means on the retaining element, as will be explained in more detail below, in such a way as to allow individual sheets to be directed on through the separating gap.

If the information obtained on the shape and state of the stack indicates a very high rate of disturbances, it may also be advantageous not to transport the stack in question to the separating apparatus at all.

An advantage of the inventive solution lies in the fact that a high percentage of the disturbances which occur in the separation process can be immediately eliminated selectively without any manual intervention. This allows for improvement of the throughput of the separating apparatus and leaves the operator free for other tasks. The type of mechanical manipulation at the stack can be made contingent solely on the type of disturbance detected, whereby a specific disturbance can always be immediately assigned that measure with which the best results are obtained on the basis of experimental values. Since the mechanical manipulation at the stack is carried out only when required and generally only for a short time, the disadvantages stated above in connection with the prior art are dispensed with.

A further advantage of the inventive developments is that measures can be taken to eliminate errors not only in accordance with the type of disturbance, i.e. when short separation omissions occur, separation begins after a delay, a separation process which has already been initiated is interrupted for a relatively long time, double withdrawals occur repeatedly, etc., but also in accordance with the specific state and shape of the stack, i.e. also taking current information on the stack going through the separation process into consideration.

Further advantages and developments of the invention can be found in the subclaims and in the following description of an embodiment of the invention with reference to the adjoined drawing.

Figure 2:
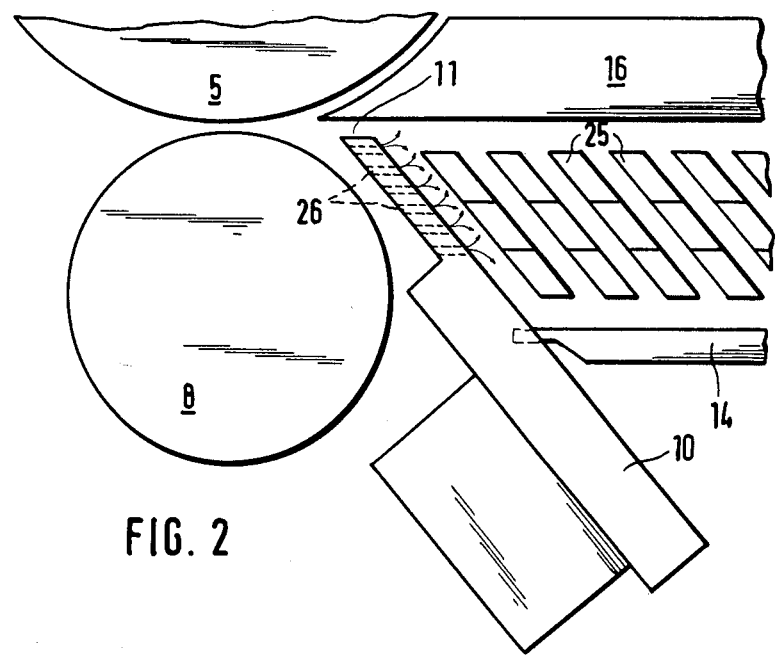

The drawing shows:

FIG. 1 the side view of a separating apparatus and a system for transporting stacks of sheet material FIG. 2 a cutaway portion of the separating apparatus seen from the side, with lateral air blast nozzles and air blast nozzles in the retaining means via which nozzles air blasts can be used to influence the stack going through the separation process.

Figure 3A:
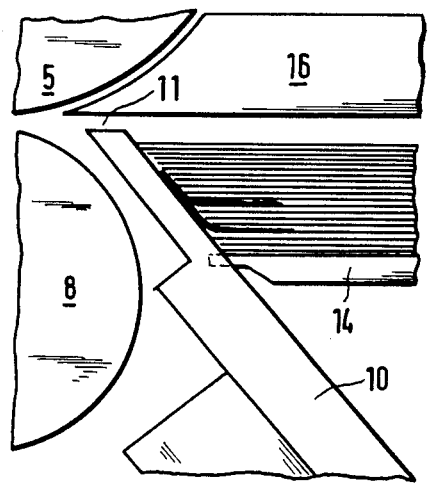
Figure 3B:
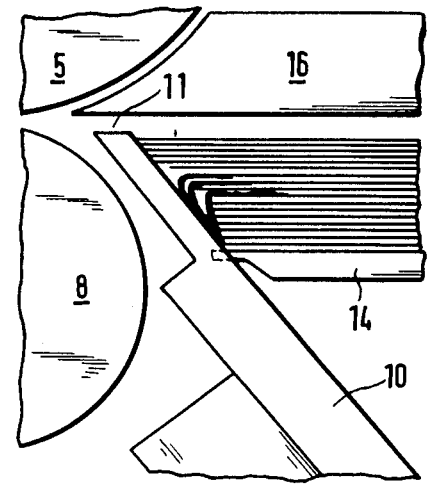
Figure 4:
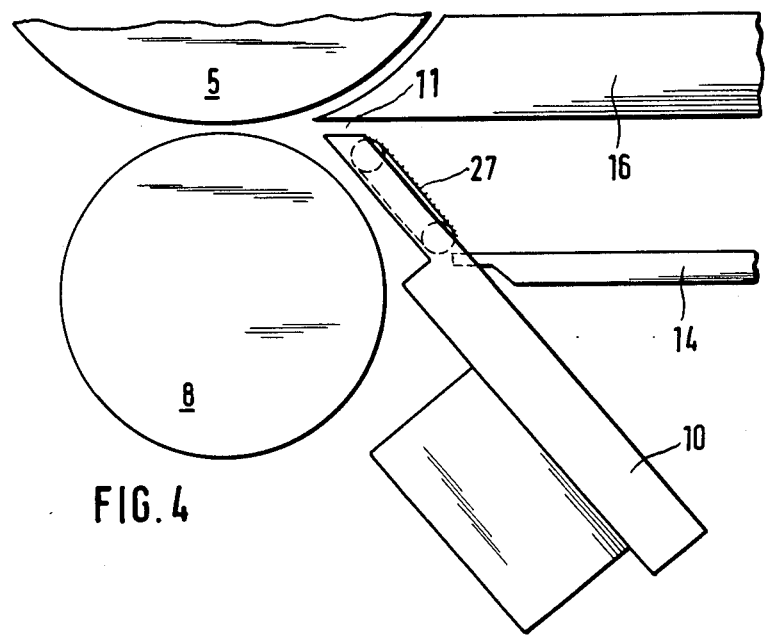
Figure 5:
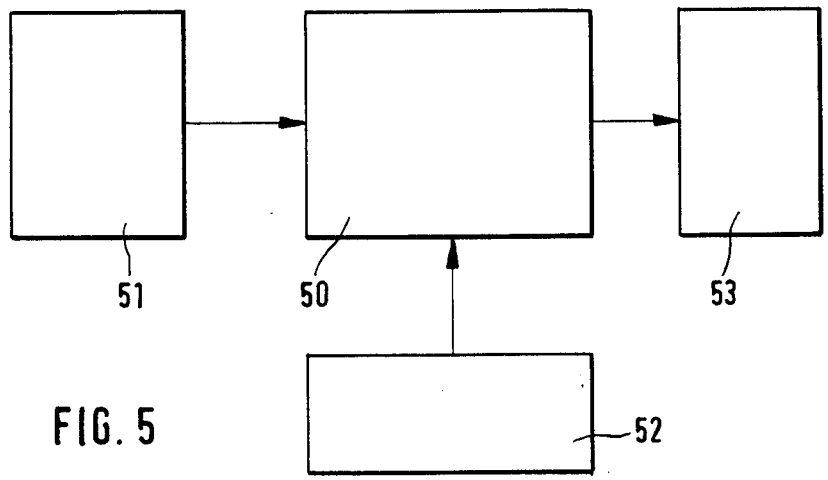

FIG. 3a a partial cutaway portion of the separating apparatus seen from the side, with sheets of the stack which have pushed upwards in front of other sheets at the retaining means FIG. 3b like FIG. 3a except that sheets of the stack have pushed downwards in front of other sheets at the retaining means FIG. 4 like FIG. 2 except that a flat belt with a reversible direction of rotation is integrated in the retaining means to be used for influencing the leading edge of the sheet stack FIG. 5 a block diagram for the control means for processing the various disturbances occurring during separation of stacks of sheet material FIG. 1 shows in an exemplary embodiment a separating apparatus 1 as used, for example, in high speed sorting machines. A stack transporting system 2 is used to convey stacks 3 of sheet material successively to the separating apparatus whenever the last sheet of the preceding stack has been separated as detected by detector 17.

The separating apparatus consists essentially of a pressure plate 14, a forward feed means 16, a separating roller 5, a a retaining roller 8 and a retaining means 10.

Stack 3 of sheet material arriving on stack transporting system 2 is deposited on pressure plate 14 and pressed against forward feed means 16 with light pressure by driving motor 15 in the direction of arrow 12. Forward feed means 16 is designed as an air conducting plate, for example. By aid of forward feed means 16, sheets are conveyed sequentially from stack table 14 to separating roller 5. The air conducting plate has air blast bores to be supplied with air blasts for this purpose, said bores being arranged in such a way as to provide the uppermost sheet of the stack with a thrust component toward separating roller 5. By means of suction openings 7 disposed in a row parallel to the axis of separating roller 5, the leading edge of each sheet is grasped and transferred by rotation in the direction of arrow 6 to the following transport system consisting of belts 21 and transport roller 20.

During the separation process, the leading edges of the sheets lie against retaining means 10, a separating gap 11 with a predetermined width being set between retaining means 10 and air conducting plate 16 or separating roller 5 in such a way that only the upper sheets of the stack lying directly against air conducting plate 16 are ever conveyed to separating roller 5, if possible.

Retaining roller 8, which rotates in the direction of arrow 9 contrary to the direction of separation, is provided opposite separating roller 5. Retaining roller 8 has suction openings all along its periphery. The sheets which have already been transported by means of air conducting plate 16 through the separating gap of retaining means 10 between separating roller 5 and retaining roller 8 are held back by retaining roller 8 rotating contrary to the direction of separation, so that separating roller 5 only separates the uppermost sheet of the stack in each case. For the details of the separating apparatus, in particular the air conducting plate, described only briefly here, reference is made to German Offenlegungsschrift No. 28 14 306.

As mentioned, the throughput of a bank note sorter is essentially determined by the efficiency of the separating apparatus. The invention is thus based on the objective of optimizing the efficiency of this apparatus especially for the processing of sheets of different qualities. According to an embodiment of the invention, the disturbances in the separation process which are fundamentally unavoidable in separating apparatus are detected and manipulation carried out at the stack using mechanical means in accordance with the type of particular disturbance. This manipulation is capable of eliminating the disturbance without any manual intervention.

Examples of disturbances in the separation process are:

separation omissions, i.e. the absence of individual bank notes in a stream of bank notes which is normally serial delayed separation, i.e. bank notes separated too late, spaced incorrectly from the preceding and following notes interrupted separation, i.e. interruption of the separation sequence although bank notes are still located in separating apparatus 1 double withdrawals, i.e. the withdrawal of two or more sheets at the same time

The above-mentioned irregularities in the separation flow may be detected, for example, by detector 22 shown in FIG. 1, which is disposed in transport system 20, 21 subsequent to the separating apparatus. In order to allow for exact detection of separation omissions or delays, detector 22, which is designed as a light barrier, for example, is coupled with a so-called "machine timing". The machine timing is obtained by aid of a timing disk 23 which is rigidly connected with the movement system, for example the separating roller. The number of pulses obtained from the timing disk by means of a light barrier 24 is a measure of the path covered by the bank note, regardless of the speed of the note. When the separator is working properly, the bank note, after being grasped by separating roller 5, must pass the light barrier with its leading edge after a predetermined number of timing pulses. Depending on how many pulses there are betwen the detected number of pulses and the predetermined number of pulses, delayed separation, a separation omission or an interruption in separation can be deduced. Double or multiple withdrawals can also be detected on the basis of the amount of light passing through the bank note. The stack is influenced using different mechanical means depending on the type of disturbance.

It is fundamentally possible to manipulate the stack mechanically from the top or the bottom of the stack and from the four abutting sides. With respect to the apparatus shown in FIG. 1, the underside of the stack can be influenced by aid of pressure plate 14. A step motor 15 is provided to move pressure plate 14, being particularly well-suited as a driving unit since it allows for a great variety of kinds of movement for the pressure plate. When the step motor is driven accordingly, the stack to be separated can be suddenly lowered, shaken, vibrated or influenced by strong brief pressure pulses, for example.

It has become apparent that sudden lowering of the pressure plate, whereby the stack follows the pressure plate due to gravity in the embodiment shown in FIG. 1, leads to success in most cases when separation has been interrupted, for example. The reason for the interruption of separation is often that several bank notes have been jammed in the separating gap. The sudden lowering of the pressure plate releases the jam so that separation continues without any disturbance after the pressure plate is returned to its original position.

In the following, further possibilities of influence the other sides of the stack wall be mentioned.

As shown in FIG. 2, a row of air blast openings 25 are provided in the area of the longitudinal side of the stack, said openings being connected to a compressed air source which is not shown. Using these air blast openings 25, the longitudinal side of the stack going through the separation process can be subjected to a continuous or pulsed air blasts in the case of a disturbance. If stacks are being separated in particular which contain flaccid and frequently used sheets, it may happen that individual sheets adhere to each other relatively firmly due to the high static friction resulting from contamination. If an air blast is blown into the stack from the side, this reduces the coefficients of friction between th sheets and loosens up the stack in general. Due to the reduced friction, the selective forward transport of individual sheets from the stack toward separating roller 5 by means of air conducting plate 16 is improved.

In order to influence the leading edge of the stack in a similar manner, air blast openings 26 may also be provided in retaining means 10, as shown in FIG. 2. By means of these openings, bank notes which adhere to each other relatively firmly in the leading edge area can be separated from each other particularly well.

FIGS. 3a and 3b show two further irregularities relating to the leading edge of the stack and giving rise to disturbances. If the leading edges of individual sheets in the stack are not aligned properly, the protruding leading edges may be pushed in front of the other sheets of the stack when the stack hits retaining means 10. Such folded leadings edges lead either to multiple separation or to several bank notes being wedged in separating gap 11 (FIG. 3a). Bank note edges folded over toward pressure plate 14 (FIG. 3b) usually close separating gap 11, which also leads to the separation process being interrupted.

FIG. 4 shows a possibility of eliminating the above-mentioned irregularities at the leading edge of the stack. For this purpose, a friction roller with a reversible direction of rotation or an endless belt 27, as shown, having a roughened surface, for example a fur trimming, is provided in retaining means 10. If the friction roller or the endless belt shown in FIG. 4 is driven toward separating gap 11 or toward pressure plate 24, folded leading edges (FIGS. 3a, b) can be pushed back into the stack. With an equally good effect, a toothed element may be inserted into retaining means 10 which acts on the leading edge of the stack driven in an oscillating fashion like the feed dog of a sewing machine. The latter measure is advantageous in that the element disposed in the area of the leading edge can be retracted into the retaining means in the inactive state, thereby having no effect on the separation process during normal operation.

A further measure for influencing the leading edge of the stack consists in changing the effect of retaining roller 8. As mentioned, the retaining roller provided with suction openings is intended to hold back those sheets which have already passed through the separating gap but are not lying against separating roller 5. The desired effect of the retaining roller depends on, among other things, the quality of the sheets (e.g. stiffness). By controlling the vacuum at the suction openings, it is possible to change the effect of the retaining roller accordingly, thereby reducing or increasing the pushing-back effect.

The upper side of the stack lies against air conducting plate 16 whose blast openings generate a cushion of air and are directed so as to impart to the sheets at least a thrust component toward the separating gap. It is possible to influence the upper side of the stack in different ways by increasing, pulsing or briefly switching off the air blast.

When the monitoring apparatus detects disturbances in the flow of separation or the shape of the stack shows irregularities, one or more of the above-mentioned possibilities of intervention are selectively triggered at the same time in order to influence the stack about to be separated.

The pneumatic means are also considered to be mechanical means in the broadest sense, which may take effect separately or else jointly and influence the stack accordingly in order to eliminate the disturbance automatically.

As mentioned, a development of the invention consists in making the above-described forms of manipulation at the stack contingent not only on the type of disturbance detected, but also on what information is present on the state and shape of the stack about to be separated. Information on the stack may be detected both before separation in stack transporting system 2 and during separation in the separating apparatus, using appropriate sensors.

A plurality of sensing means 13 may be provided in the separating apparatus or in air conducting plate 16 beside or behind one another, distributed over the surface of the stack, in order to obtain information on the surface profile or the waviness of the stack. It can be ascertained by evaluating the signals of all sensing means whether the stack, in particular the uppermost sheet to be separated, is lying with its entire surface against the air conducting plate or whether the stack is very wavey or deformed.

When a stack of sheet material has been fed into the separating apparatus, individual sheets may, as shown in FIGS. 3a and 3b, be pushed downward or upward at retaining means 12 in front of the leading edges of other sheets, thereby disturbing the separation process. This irregularity at the leading edge of the stack can be detected if blast nozzles are provided in the retaining means which measure the dynamic pressure in the area of the leading edge. When the leading edges of individual sheets are pushed in front of the abutting edge of the stack, the dynamic pressure will increase, thereby making it possible to recognize the irregularity at the leading edge of the stack.

In order to make it possible to obtain information on the state and shape of the stack even before separation, appropriate sensors are provided in the stack transporting system. As in the separating apparatus, mechanical sensors, for example sensors similar to sensors 13, may also be provided here above and below the transport system for detecting the thickness and shape of the stack. If stacks of sheet material have been stored in a curved shape for a relatively long time or tied up in bundles with tight rubber bands or string, they are usually greatly deformed or wavy. Not only the thickness and waviness can be detected beforehand in the stack transporting system, but also whether one or more sheets protrude out of the stack or are crooked in the stack. These deviations from the ideal or standard stack can be detected during the transport of the stack using known light barriers as shown at 35 or light curtains, for example. The information obtained on the shape and the state of the stack (stack information) before and during separation is fed to a data processing and control unit 50, as shown in FIG. 5. This unit, which may be realized, for example, by aid of a microprocessor system with an appropriate storage volume, collects the current information on the stack going through the separation process. Since at any time there is one stack in the separating apparatus and one stack in the waiting position in the stack transporting system, the data of at least two stacks are always being detected and maintained.

As shown in FIG. 5, data are fed to control unit 50 from sensor unit 51 and sensor unit 52, these data triggering measures in module 53 after being evaluated appropriately. For the sake of clarity, all elements provided for monitoring the separation sequence and indicating the type of disturbance are combined in module 51 in the view of FIG. 5. Baustein 52, on the other hand, combines all sensors responsible for testing the state and shape of the stack. Finally, module 53 includes the apparatus elements used in the separating apparatus or in stack transporting system 2 for influencing the shape and state of the particular stack being processed.

The data processing and control unit now fulfils the tasks of
storing the current data made available by module 52
initiating precautionary measures (precautionary stack manipulation) in accordance with these data, if necessary
in case of disturbance, evaluating the data on the type of disturbance obtained from module 51 and initiating the measure adapted to the particular disturbance, possibly taking the data from module 52 into consideration (elimination of the disturbance)

Depending on what information is made available by modules 51 and 52, the measures initiated by module 53 may be very different even though the type of disturbance is the same. For example, if module 52 ascertains that the stack of bank notes being processed at the moment is of very high quality and that the shape of the stack corresponds exactly to that of a "standard stack", and module 51 signalizes the separation of double withdrawals, the cause for this disturbance is considered to be the thinness of the individual bank notes and the low friction between these bank notes. This disturbance can be eliminated, as experience has shown, by increasing the vacuum on the retaining roller.

If poor bank note quality (increased stack thickness) has been ascertained for the same type of disturbance, i.e. an increased rate of double withdrawals, this disturbance is eliminated by blowing compressed air into the leading and/or side edges of the stack and possibly shaking the stack at the same time. For experience has shown that bank notes of poor quality "stick together" to a considerable extent, which can usually be taken care of by lateral air and shaking. In the case of new bank notes, these measures would tend to increase the rate of double withdrawals instead of reducing it.

As already mentioned, the data processing and control unit also fulfils the task of taking precautionary steps. If information is presnet indicating irregularities in the stack which will most probably lead to disturbances in the separation sequence, precautionary measures are initiated even before a disturbance occurs.

For example, if it is detected by aid of the light barriers provided in the stack transporting system that sheets are protruding out of the front face of the stack, this irregularity will lead to disturbances caused by folded leading edges of bank notes, as already explained in the description of FIGS. 3a, b. Taking this fact into consideration, all measures necessary for eliminating this irregularity are immediately initiated after the stack has been introduced into the separating apparatus. In the present case, the folded leading edges are grasped in frictional engagement by aid of the mechanical units disposed movably in retaining element 10, and pushed back into the stack.

We claim:

1. In sheet separating apparatus for separating sheet material having variable degrees of geometric and physical condition, including a sheet material stack holding means, a sheet feeding means, a sheet withdrawing means and a stack retaining means, wherein the sheet material is conveyed in stacks in variable physical and geometric conditions via a stack transporting system to the stack holding means up to the stack retaining means, from which the sheet material is separated from the stack by a separation process, fed sheet by sheet to a sheet feeding system leading on further by the interaction of the feeding, withdrawing and retaining means, the improvement comprising first means arranged to rearrange the geometric and physical condition of the stack so that a predetermined geometric and physical condition of the stack is effected by manipulation of the sheet material in the stack during the process of separation; a second means for monitoring the separation sequence and detecting a defect in the separation process; and a control unit in communication with said first and second means arranged to activate the first means in case of the occurrence of an undue deviation in the separation process.

2. The improvement according to claim 1, wherein the first means comprises a movable stack presser arranged to exert pressure on the stack from top to bottom when actuated.

3. The improvement according to claim 2, including a step motor controlled by said control unit, and arranged to drive said presser.

4. The improvement according to claim 2 wherein the stack presser is arranged so that the stack may be briefly compressed via the presser under the control of the control unit.

5. The improvement according to claim 2 wherein the stack presser is arranged to increase the pressure in the stack when the control unit activates said first means.

6. The improvement according to claim 1, wherein the first menas comprises pneumatic elements arranged to subject at least one edge area of the stack to air blasts.

7. The improvement according to claim 6, wherein each stack is transported so that the leading edges of the stack material abuts the stack retaining means, and including pneumatic elements disposed in said stack retaining means.

8. The apparatus according to claim 7, wherein the pneumatic elements are arranged to subject the leading edge only of each stack to air blasts.

9. The improvement according to claim 1, wherein said stacks are transported so that the leading edges of the sheet material abut said stack retaining means, and wherein the first means comprises a movable friction surface means located at the stack retaining means, and means for driving the friction surface means to engage the leading edges of the sheets of said stacks in a direction tending to drive any sheet leading edges extending forwardly of the stack and out of the plane of the sheet back towards the stack; said friction surface driving means controllable via said control unit.

10. The improvement according to claim 9, wherein the movable friction surface is arranged to be driven in an oscillating fashion in such a way that the friction surface periodically protrudes from the retaining element towards the stack to periodically engage the sheet leading edges.

11. The improvement according to claim 1 including a separating means for carrying out the separation process and wherein the second means comprises optical sensors arranged to sense the functioning of the separation process in interaction with a clock generator coupled with the separating means.

12. The improvement according to claim 1 wherein said first means includes a stack lowering and raising means arranged to briefly and rapidly raise and lower each stack under the control of said control unit.

13. The improvement according to claim 1, including third means for sensing the geometric and physical condition of the stack of sheet material at least at the place of separation, said control unit arranged to activate said first means in a manner specific to the condition of the stack as sensed by said third means when said second means detects a defect in the separation sequence.

14. The improvement according to claim 13 wherein said second means are arranged to sense at least the waviness of the stack at least in the stack holding means.

15. The improvement according to claim 14, wherein said second means are arranged to sense the waviness of the stack while being conveyed by the transporting system and wherein said second means includes multiple stack condition sensors disposed one beside the other in the stack transporting system.

16. The improvement according to claim 14, wherein said second means comprise multiple stack condition sensors arranged to generate individual signals and wherein at least the waviness of the stack is sensed by comparing the individual signals of the stack condition sensors with each other by sequence comparing means.

17. The improvement according to claim 13 wherein the second means comprises optical sensors disposed in the stack transporting system and arranged to sense the condition of the stack during transporting to the stack holding means.

18. The improvement according to claim 17, wherein the optical sensors are oriented normal to the direction of stack transport and wherein the optical sensors are arranged to test the stack condition while the stack is transported past said light barriers.

19. The improvement according to claim 13 wherein the second means are pneumatic elements arranged to sense the condition of at least one of the stack edge areas pneumatically.

20. The improvement according to claim 19, wherein the pneumatic elements comprise air jet nozzles disposed in the stack retaining means and which are arranged to act selectively upon the leading edge area of the stack after the latter has been positioned in the stack holding means, and to evaluate the condition of the stack as a function of the dynamic pressure in each air jet nozzle.

21. The improvement according to claim 13, wherein the second means comprises mechanical sensor means arranged to sense at least whether or not the stack is lying with its entire surface abutting an adjacent wall of the stack holding means.

22. The improvement according to claim 13 wherein the second means includes a stack condition sensor disposed in the stack transporting system, said stack condition sensor arranged to sense the condition of the stack in the transporting system, and means for controlling transportation of the stack in the event said stack condition sensor in the stack transporting system senses an undersirable stack condition.

23. The improvement according to any one of claims 1 or 13 wherein said first means includes means to shake the stack when the control unit activates said first means.

24. The improvement according to any one of claims 1 or 13 wherein said first means includes means for blowing compressed air into at least the side area of a stack located in the stack holding means when the control unit activates said first means.

25. The improvement according to any one of claims 1 or 13 wherein the sheet feeding means includes an air conducting plate and means for supplying sheet feeding air pressure to said conducting plate, and wherein the control unit includes means arranged to selectively briefly switch off, pulse, and increase the air pressure applied to the air conducting plate when the control unit activates said first means.

* * * * *